United States Patent
Meckler et al.

(10) Patent No.: US 8,803,031 B2
(45) Date of Patent: Aug. 12, 2014

(54) WIRE FEEDER WITH AUTO-CONFIGURE POWER SUPPLY

(75) Inventors: Andreu P. Meckler, Mentor, OH (US); Keith Clark, Mentor, OH (US); Edward Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 726 days.

(21) Appl. No.: 12/476,511

(22) Filed: Jun. 2, 2009

(65) Prior Publication Data
US 2010/0301029 A1    Dec. 2, 2010

(51) Int. Cl.
B23K 9/10    (2006.01)

(52) U.S. Cl.
USPC ............. 219/130.1; 219/136; 219/137 PS (58) Field of Classification Search
USPC ............ 219/130.1, 130.5, 136, 137 PS, 137.2
See application file for complete search history.

(56) References Cited

U.S. PATENT DOCUMENTS

| | | |
|---|---|---|
| 4,508,954 A | 4/1985 | Kroll |
| 4,584,458 A | 4/1986 | Tremblay et al. |
| 7,041,937 B2 | 5/2006 | Ihde et al. |
| 7,098,425 B2 * | 8/2006 | Meckler .................. 219/137.71 |
| 2004/0245232 A1 | 12/2004 | Ihde et al. |
| 2005/0199605 A1 * | 9/2005 | Furman et al. ............... 219/132 |
| 2005/0230372 A1 * | 10/2005 | Ott ............................. 219/132 |
| 2007/0007265 A1 * | 1/2007 | Myers et al. ........... 219/137 PS |

FOREIGN PATENT DOCUMENTS

| | | |
|---|---|---|
| CA | 2243208 | 5/2001 |
| DE | 41 39 041 | 6/1992 |
| JP | 61 137675 | 6/1986 |
| JP | 9 128112 | 5/1997 |
| JP | 9 262666 | 10/1997 |

OTHER PUBLICATIONS

PCT/IB2010/001324 International Search Report.
PCT/IB2010/001324 International Written Opinion.

* cited by examiner

*Primary Examiner* — Henry Yuen
*Assistant Examiner* — Ayub Maye
(74) *Attorney, Agent, or Firm* — Hahn Loeser & Parks LLP (57) ABSTRACT

A wire drive system includes a wire feed motor for feeding welding wire in a continuous welding process. The wire drive system further includes a controller connected to the wire feed motor for driving the motor responsive to a command signal. The controller is capable of detecting the source of power from which the wire feed motor is driven wherein a first possible source of power is taken from the welding arc and wherein a second possible source of power is taken from the welding power supply.

9 Claims, 8 Drawing Sheets

WIRE FEEDER WITH AUTO-CONFIGURE POWER SUPPLY

TECHNICAL FIELD

The present invention pertains to wire feeders for welding power supplies, and more particularly, to wire feeders that automatically switch between power sources.

BACKGROUND OF THE INVENTION

Wire feeders are commonplace in the field of welding. As is well known, they are used in conjunction with a welding power source for feeding a wire electrode to a workpiece during the welding process. The electrode may include solid wire, which in some instances is coated depending on the application. Other applications utilize flux cored wire. The wire is continuously fed at a rate which may vary during the welding process. Such processes include, for example, FCAW and self-shield FCAW arc welding.

Manufacturers construct welding accessories for use with a particular application or a specific type of welding machine. In the case of wire feeders, it is known for a manufacturer to construct a unit which draws power from the welding arc. These types of wire feeders may be especially useful for construction site or field use where welding frequently occurs away from the welding power source. Other wire feeders draw power from a separate regulated power supply, since some applications require greater precision and may be adversely affected by power drawn from across the arc. Pulse welding is one example. This type of wire feeder utilizes a separate cable to conduct power from the regulated power supply, which may reside in the welder. In the present state of the art, these systems are not directly interchangeable.

BRIEF SUMMARY

The embodiments of the present invention are directed to devices and methods of arc welding, including wire feeder drive systems that can be easily connected to receive power from different power sources and from different types of arc welders without having to significantly modify the wire feeder. The invention will be described with particular reference to wire feeders in association with MIG or TIG welders. However, it will be appreciated by persons of ordinary skill in the art that the embodiments described herein can be utilized in any type of welder requiring a continuous feed of wire. The wire feeder may include electrical circuitry that can detect and activate the wire drive system responsive to different sources of power as, for example, from a regulated power supply or from the welding arc.

DETAILED DESCRIPTION OF THE INVENTION

Figure 1:
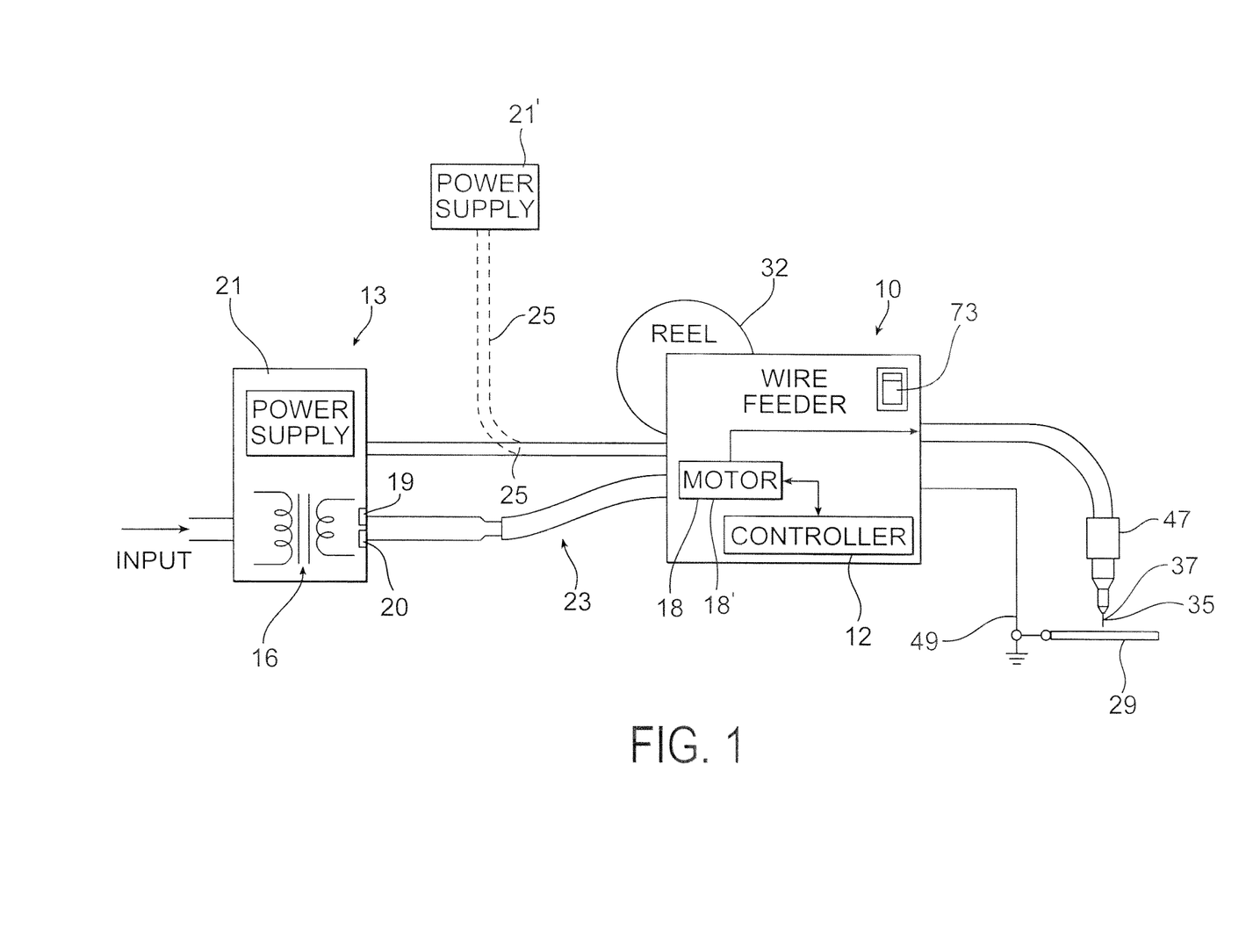
FIG. 1 is a schematic representation of welding power source and wire feeder according to the embodiments of the present invention.

Referring now to the drawings wherein the showings are for purposes of illustrating embodiments of the invention only and not for purposes of limiting the same, FIG. 1 shows a wire feeder depicted generally at 10. The wire feeder 10 may be used in conjunction with a welding power source 13 as manufactured by, for example, the Lincoln Electric company in Cleveland, Ohio. The welding power source 13 may receive electrical input power from an outside source that is directed to a transformer 16 having primary and secondary windings in a manner well known in the art. Output from the secondary windings may be directed to a rectifier, not shown, providing DC supply power to the output terminals or studs 19, 20. It is noted that in an alternative embodiment, output power from the welding power supply may be supplied in the form of AC type power. The welding power source 13 may include a power controller, not shown, designed to control output power at the studs 19, 20. In one mode of operation, the power controller may function to maintain constant current; useful in certain manual applications where arc length varies. Conversely, the power controller may operate in a constant voltage mode. The welding power source 13 may additionally include a separate regulated power supply 21 for delivering electrical power to a welding accessory, which may be a wire feeder 10 as will be discussed further in a subsequent paragraph. Welding cables, designated generally at 23, may be connected to the welding power source 13, and more specifically to the studs 19, 20 for delivering welding current to a work piece 29 through an electrode 35 and work piece connector 49. The electrode 35 may include welding wire 37 supplied from a continuous source and fed through the wire feeder 10. The welding cables 23 may be connected through the wire feeder 10 as shown in FIG. 1. In one embodiment, the wire feeder 10 may draw power to operate the wire feeder motor 18 from the open circuit voltage of the welding power source 13 and subsequently through closed circuit voltage once the welding arc has been established. Additionally, power to operate the wire feeder 10 may come from the separate regulated power supply 21. An external cable 25 may be required to connect electrical power to the wire feeder 10 from the regulated power supply 21. It is noted that the embodiments of the subject invention are not limited to the type of welding power source 13 and/or power controller. Rather, any type of welding power source 13 may be utilized that functions to allow power to be taken from across the arc for operating the wire feeder motor 18.

Figure 2:
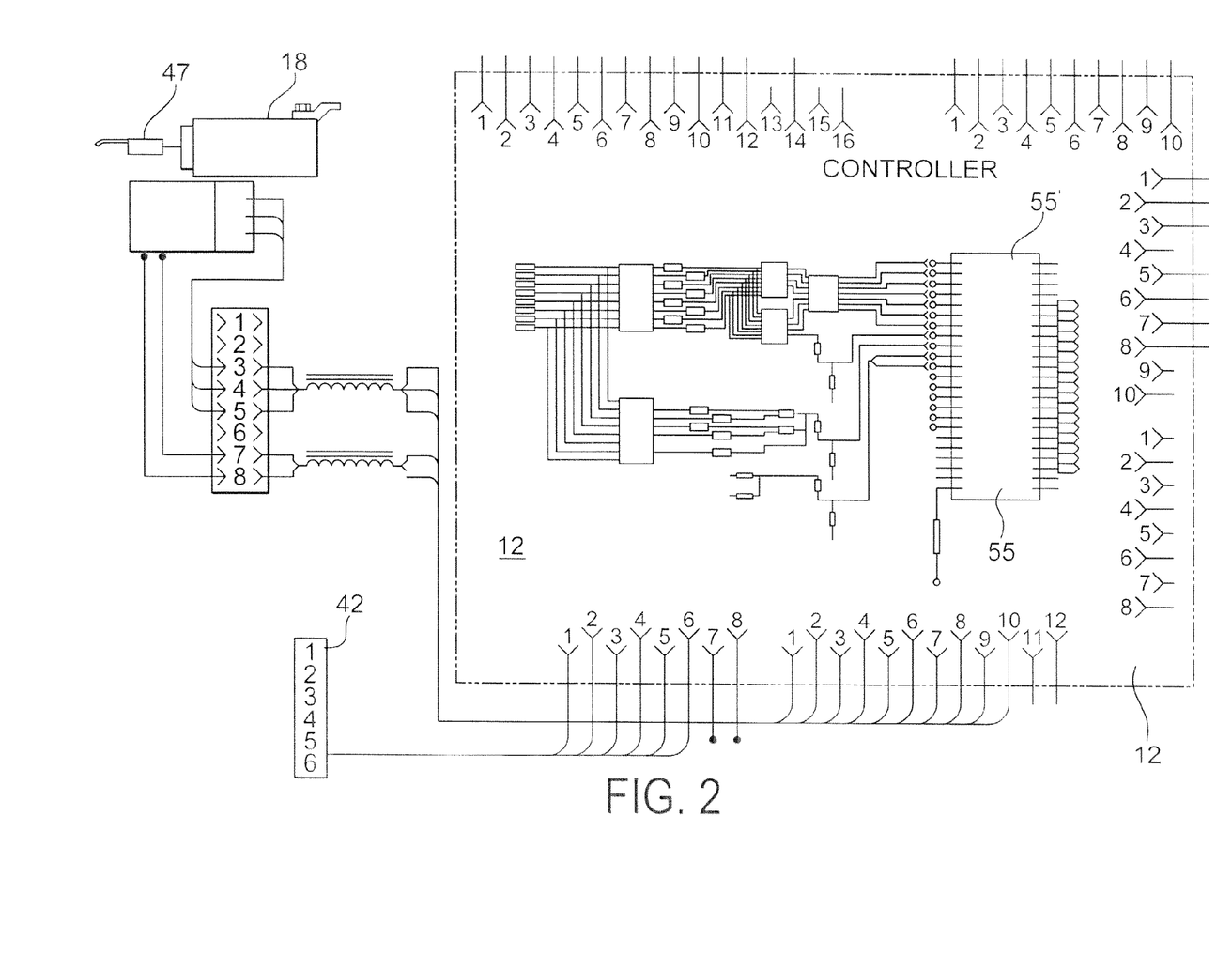
FIG. 2 is a schematic wiring diagram of the wire feeder motor and the controller according to the embodiments of the present invention.
Figure 3:
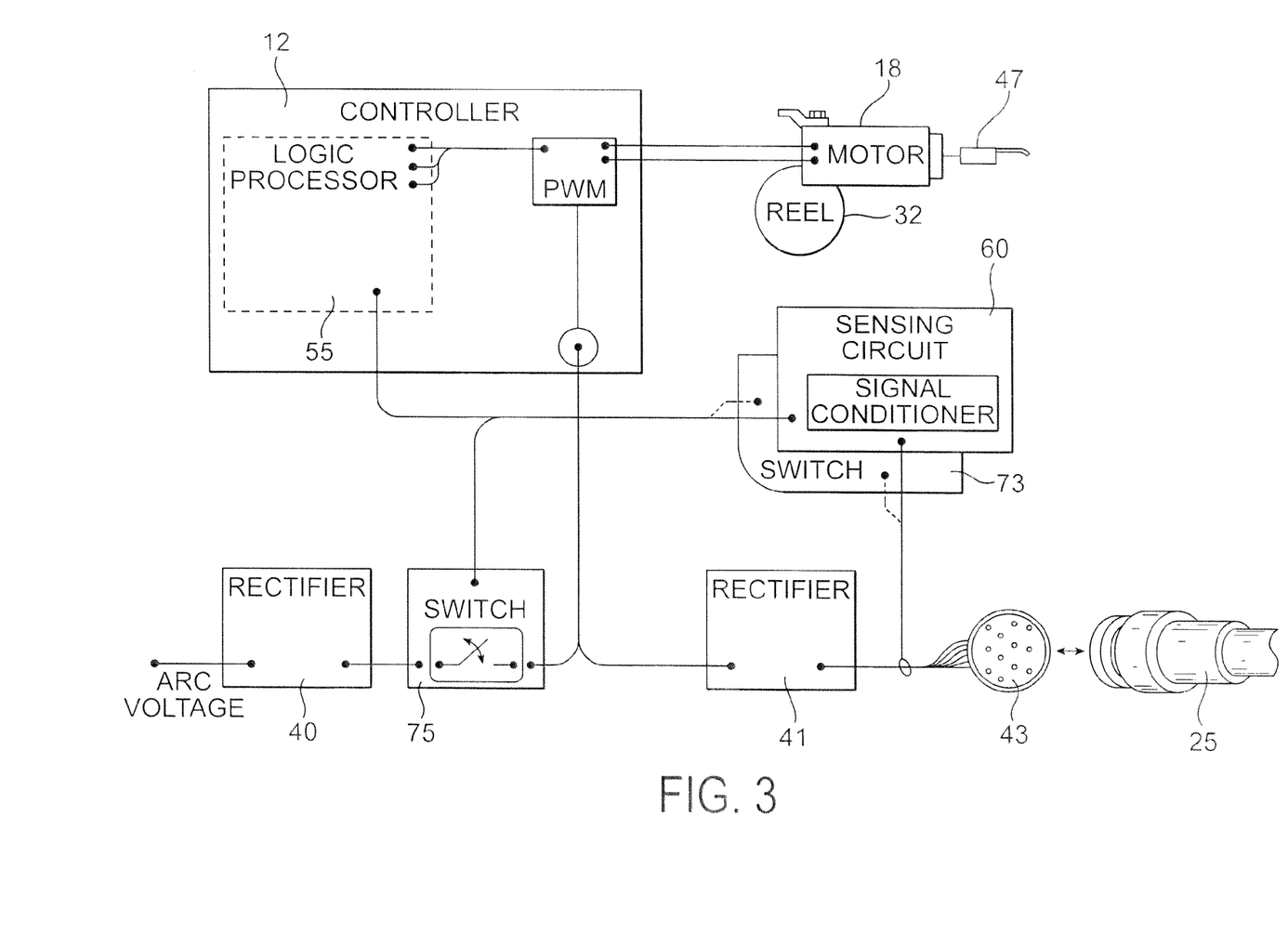
FIG. 3 is a block diagram schematically showing the control and flow of power to the wire feeder according to the embodiments of the present invention.

With continued reference to FIG. 1 and now also to FIGS. 2 and 3, the wire feeder 10 may include a wire feeder motor 18, also termed drive motor 18, which feeds the welding wire 37 drawn from a continuous source like a wire reel 32 or drum. A wire feeder controller 12 may also be incorporated to control the drive motor 18 along with other components of the wire feeder 10, like for example a gas solenoid or other circuitry. In one embodiment, an on-board power supply, not shown, may be included that filters and stores operating power from across the arc, or other power source, for use by various electrical circuits during intervals of time when available operating voltage falls below a minimum level, which may be 35 Volts. It is noted that power may be stored in one or more sets of capacitors as needed. Prior to welding, i.e. establishing an arc, the open circuit voltage may supply power to the on-board power supply, as well as to the drive motor 18. During welding, an arc is established between the electrode 35 and workpiece 49, and the closed circuit voltage supplies power to the wire feeder 10. At times, available power may be less than the requisite minimum, in which case power from the capacitors may then be used.

Welding parameters frequently change due to fluctuations in the work piece configuration and/or the electrode position. As a result, the rate at which welding wire 37 is fed through the welding gun 47 may change. Accordingly, the drive motor 18 may be a variable speed drive motor 18 for feeding the wire electrode at different rates. In one embodiment, the drive motor 18 may be a variable speed DC drive motor 18'. Power supplied to the drive motor 18 may be modulated to control its speed. In an exemplary manner, Pulse Width Modulation may be used to control the speed of the drive motor 18 via one or more switching circuits, which may comprise power MOSFETs or any other switching device chosen with sound engineering judgment. The switching circuits may be included within wire feeder controller 12 for switching power on and off to the drive motor 18 in a series of pulses. The switching circuits may function to rapidly switch power to drive motor 18 from between substantially zero volts to a nominal operating voltage in a series of pulsed waves. Varying the duty cycle of this signal, i.e. the amount of time that the pulsed waves are on relative to how long it is off, alters the average power delivered to the drive motor 18. In this way, the wire feeder controller 12 adjusts the speed of the drive motor 18 by selectively controlling activation of the switching circuits. However, it is contemplated that other types of drive motors and motor controllers may be used to control the speed of the drive motor 18 including but not limited to other types of DC motors, or AC drive motors and variable frequency drive controllers.

Figure 7:
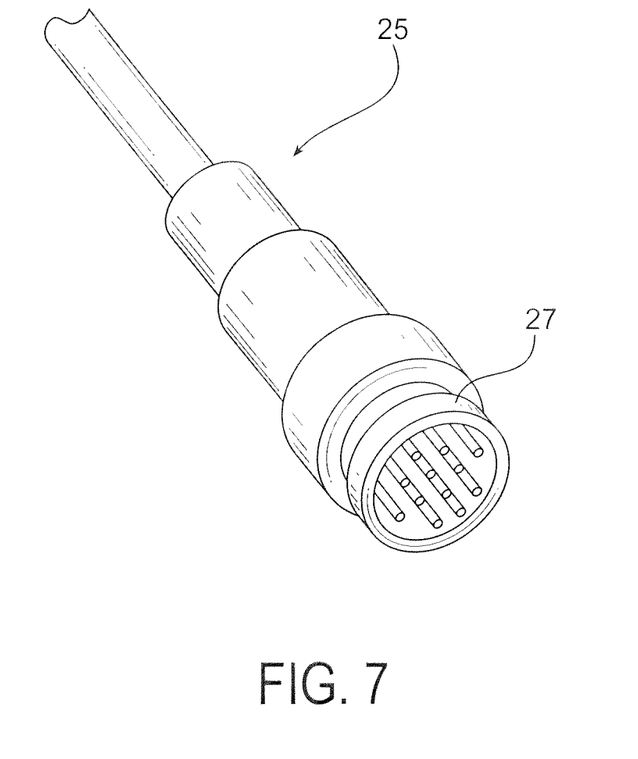
FIG. 7 is a partial perspective view of a cable for communicating power to the wire feeder from a regulated power supply according to the embodiments of the present invention.

With reference to FIGS. 1 and 7, a power cable 25 may be utilized to communicate power from the power supply 21 for operating the drive motor 18. As previously noted, the power supply 21 may be located within the welding power source 13. Accordingly, the power supply 21 may draw power from the output of the transformer 16 and further condition or regulate that power for use by the drive motor 18 in a manner consistent with the embodiments described herein. In one exemplary manner, the regulated power supply 21 may deliver substantially 42 $V_{AC}$. However, other magnitudes of voltage may be delivered without departing from the intended scope of coverage of the embodiments of the subject invention. Alternative embodiments are contemplated where a power supply 21' is distinctly separate from and/or located outside of the welding power source 13. The separate power supply unit 21' may draw power from any external source, regulating its output in a similar manner. In either type of supply 21 or 21', power to operate the drive motor 18 and other wire feeder components may be communicated through the power cable 25, which may include one or more electrical conductors and respective connector ends 27. Accordingly, power to operate the wire feeder 10 may be drawn from one of multiple disparate power sources.

Figure 8:
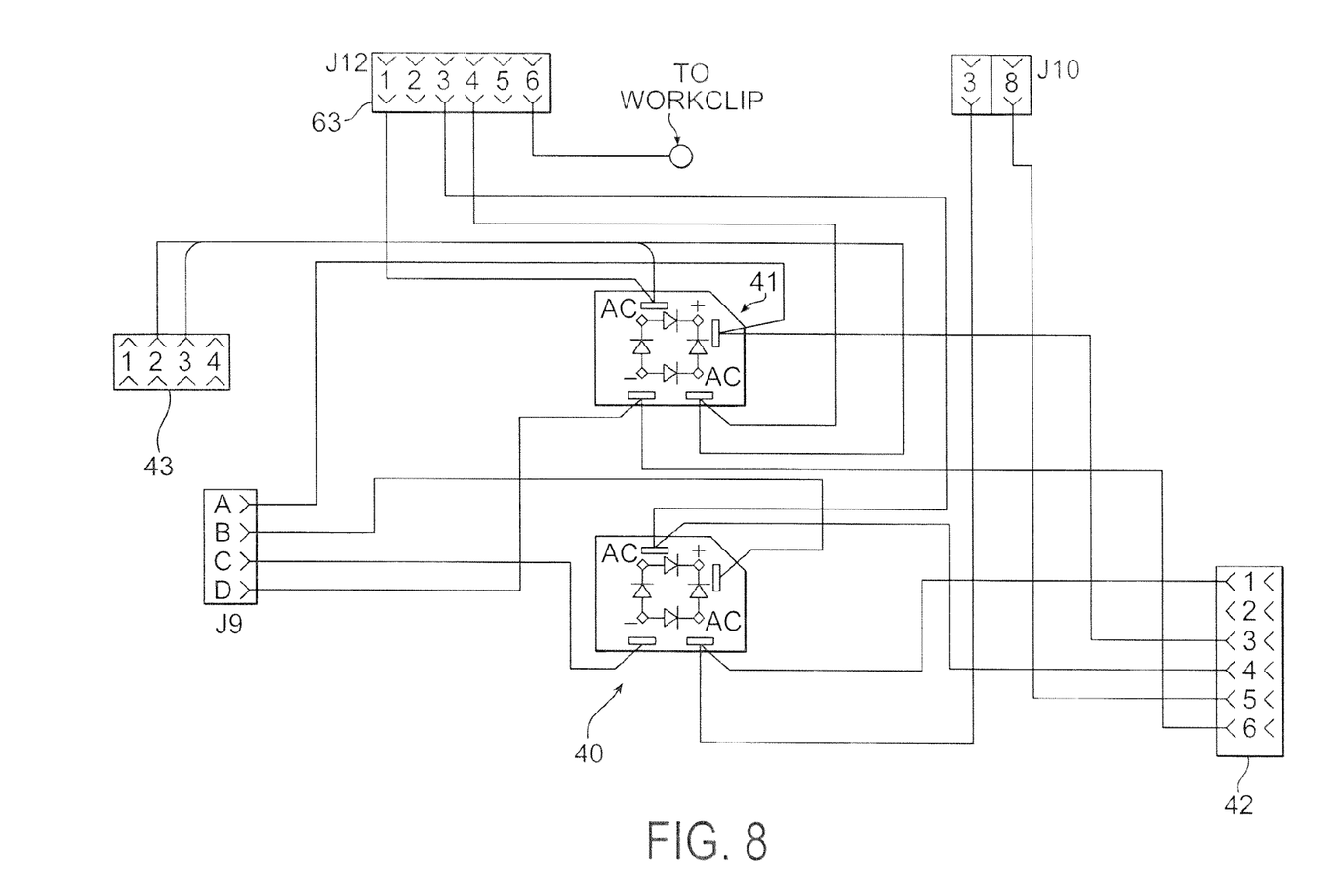
FIG. 8 is a schematic representation of a rectifying circuit according to the embodiments of the present invention.
Figure 9:
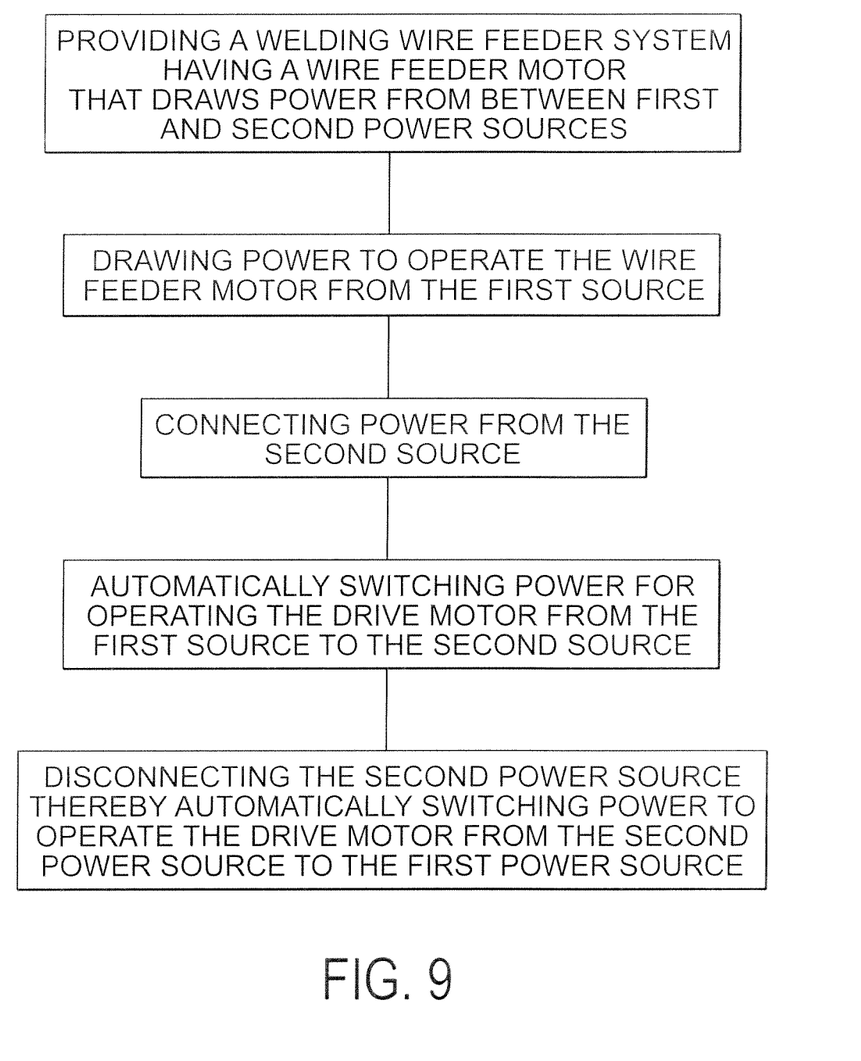
FIG. 9 is a block diagram showing the steps of connecting power to the wire feeder from between first and second substantially different power sources according to the embodiments of the present invention.

With reference now to FIGS. 1, 3 and 8, in one mode of operation, power from a first source may be taken directly from across the welding arc, i.e. the open circuit and closed circuit voltage of the studs 19, 20. Separately, power from a second source may be taken from a regulated power supply 21 or 21'. However, both sources of operating power may be channeled through the wire feeder controller 12. Power from each source may be conditioned before reaching the drive motor 18. In one embodiment, power from each source may be rectified before reaching the wire feeder controller 12. In an exemplary manner, FIG. 8 shows first 40 and second 41 bridge rectifiers that connect to the power sources via connectors 42 and 43 respectively. Subsequently, the rectified power may be filtered as accomplished by on-board capacitors, which may also be used to store supply power during time periods when supply power falls below the requisite minimum. The rectified and filtered power may then be directed to the wire feeder controller 12 for modulation as described above. It is to be understood that any other means of storing and/or conditioning the power, and more specifically rectifying the power, may be chosen with sound engineering judgment. It is also contemplated in an alternate embodiment that DC power may be delivered to the wire feeder controller 12 thereby eliminating the need for the rectifiers and accompanying components. Still, other power configurations will become apparent to those skilled in the art. All such variations are to be construed as falling within the scope of the appended claims.

With reference now to FIGS. 2 and 3, the wire feeder controller 12 may include a logic processor 55 for controlling operation of the wire feeder 10. The logic processor 55 may perform logical operations on the input data, and output timing or sequencing information for operating the wire feeder components. In one embodiment, the logic processor 55 may comprise a microprocessor 55' incorporating circuitry that can be programmed to execute a succession of instructions. The microprocessor 55' may be accompanied by additional support circuitry as needed, like for example static and dynamic memory. Although, any type peripheral support circuitry may be included as is appropriate for use with the embodiments of the subject invention. As mentioned above, the wire feeder controller 12 may activate, or deactivate, the switching circuits (not shown in the figures) used to adjust the speed of the drive motor 18. In one embodiment, the logical processor 55 may control output to the switching circuits as well as other components of the wire feeder 10 as will be discussed below. It is noted that any number of logic processors or any circuit configuration of logic processors may be incorporated into the wire feeder controller 12 without departing from the intended scope of coverage of the embodiments of the subject invention.

Figure 4:
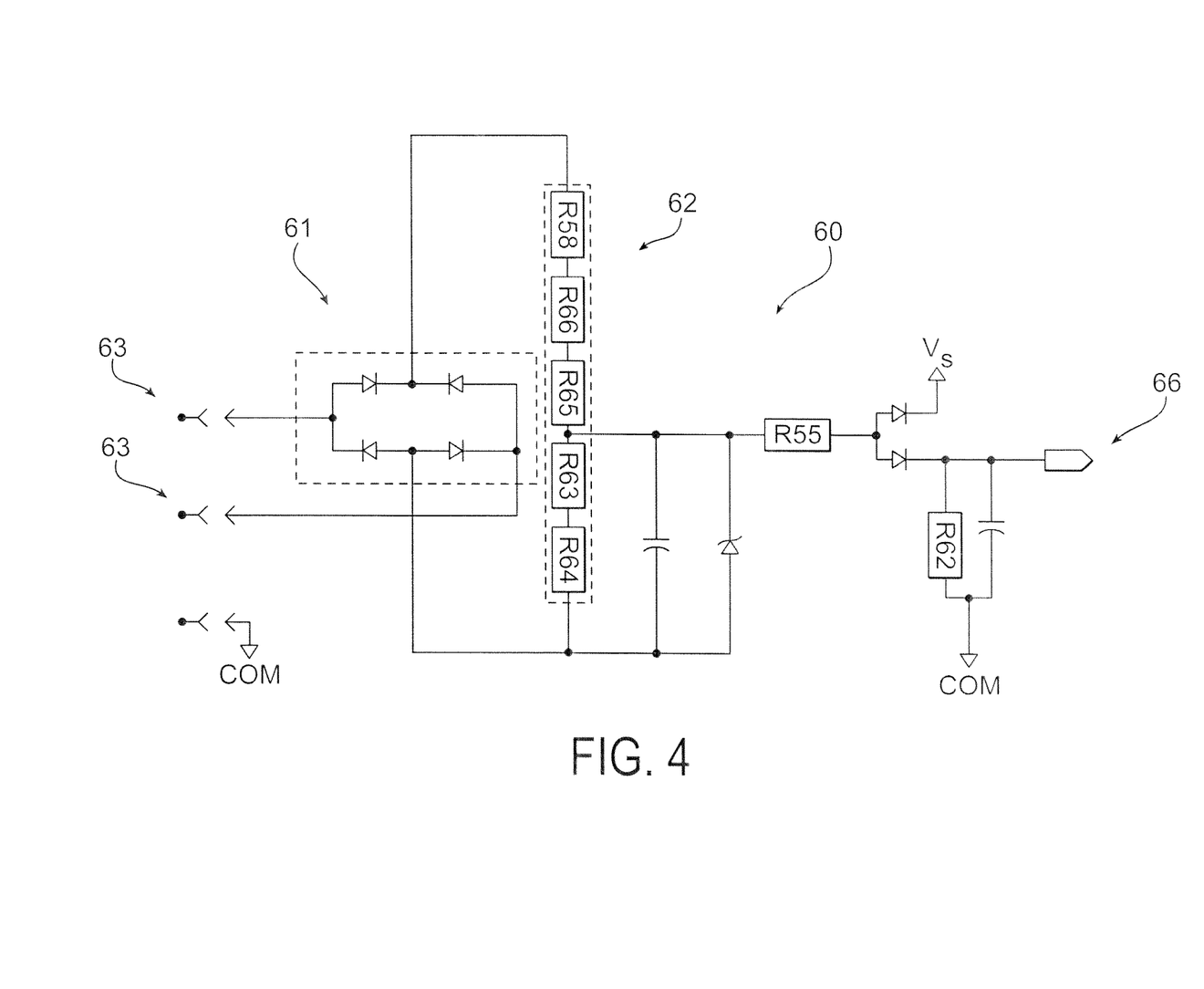
FIG. 4 is a schematic representation of one embodiment of a sensing circuit.

With reference now to FIGS. 3 and 4, a sensor or sensing circuit 60 may be situated between the wire feeder controller 12 and the regulated supply power 21 or 21'. In particular, the sensing circuit 60 may be incorporated into the wire feeder controller 12 for use in conjunction with the logic processor 55. However, the configuration and location of the sensing circuit 60 should not to be construed as limiting. Rather any physical representation or placement of the sensing circuit 60 may be chosen with sound engineering judgment. The sensing circuit 60 may include one or more inputs 63 and may have at least one output 66. In an exemplary manner, the input to the sensing circuit 60 may be taken from the conductors of the power cable 25 and the output 66 may be electrically communicated to the logic processor 55. In this way, the sensing circuit 60 may function to detect the presence or absence of electrical power on the power cable 25 and subsequently signal the logic processor 55 to respond accordingly by switching between the first and second power sources, as will be discussed further below.

With continued reference to FIGS. 3 and 4, as mentioned, the one or more inputs 63 of the sensing circuit 60 may be electrically communicated to the power cable 25. That is to say that the voltage potential across the conductors of the power cable 25 may comprise the input to the sensing circuit 60. The sensing circuit 60 may include one or more circuit portions that condition the input signal. In one embodiment, the sensing circuit 60 may include a rectifying circuit 61 that inverts the input signal and a voltage divider circuit 62 that scales the signal to within a particular range. The conditioned signal may then be compared to a predetermined value for subsequent output to the logic processor 55. In an exemplary manner, the scaled signal may be compared to a threshold voltage, which may be 5 Volts. As such, the output of the sensing circuit 60 may comprise a logical "true" or "false" based on the comparison of the conditioned input signal with the threshold voltage. It is noted that the threshold voltage may correspond to the minimum voltage needed to operate the drive motor 18. The default output signal from sensing circuit 60 may comprise a logical zero (0) or "off," which corresponds to an input signal, i.e. power cable voltage, that falls below the threshold voltage. Conversely, a logical one (1) or "on" represents voltage on the power cable 25 that meets or exceeds the threshold voltage. Stating it another way, a logical zero (0) may indicate that the power cable 25 is not connected to the wire feeder 10, while a logical one (1) indicates that the power cable 25 is connected and operable to deliver power to operate the drive motor 18. Thus, the sensing circuit 60 functions to detect when the power cable 25 is connected or disconnected from the wire feeder 10. It will be appreciated that when the operator electrically connects the power cable 25 to the wire feeder 10, the wire feeder controller 12 automatically detects the presence of the alternate power source and automatically switches the source of power supplied to the drive motor 18. It follows that when the operator disconnects the power cable 25, the sensing circuit 60 detects that power is no longer available from the alternate or second power source and signals the wire feeder controller 12 to switch the power supplied to the drive motor 18 back to the first source of electrical power. It is noted that the output of the sensing circuit is discrete in nature, namely "on" or "off", indicating the status of supply power from the power cable 25. Other embodiments are contemplated where a magnitude of the available power, i.e. voltage level, on the power cable 25 is communicated to the logic processor and/or to the operator via a display. Still, it is to be construed that the sensing circuit 60, and in particular the signal conditioning circuit portions, as described herein are exemplary in nature. Others circuit configurations and/or sensors may be realized and implemented that fall within the scope of the appended claims.

It is expressly noted that embodiments of the present invention are contemplated that do not use sensing circuits directly connected to the conductors of the power cable 25. Other sensing means of detecting the presence of power from the power cable 25 may be incorporated including, but not limited, non-contact sensors. Additionally, it is contemplated that the trigger for switching to an alternate power source may be accomplished by mechanical means. For example, a mechanical switch may be employed that detects the physical connection of the power cable 25. While additional circuitry may be required to detect the voltage potential across the power cable 25 conductors, automatic switching between power sources may be initiated by actuating the mechanical switch, which occurs when the power cable 25 is attached to the wire feeder 10. Still, any manner of detecting the presence of a connected power cable and automatically switching between power sources may be chosen with sound engineering judgment.

Figure 6:
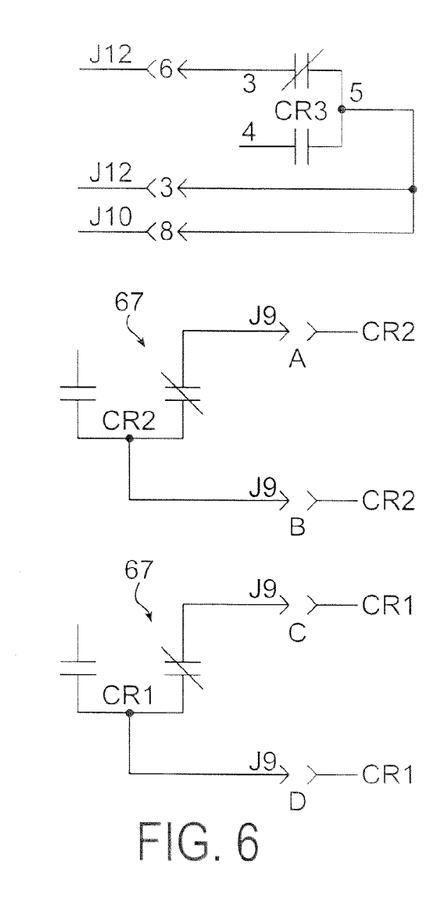
FIG. 6 is a schematic representation showing contactors according to the embodiments of the present invention.

With reference now to FIGS. 6 and 8, means for switching between power sources may include components that electrically connect or disconnect the electrical pathways of the various power sources respectively, which may be implemented by a physical break in or direct contact of electrical conductors. One example of such a device comprises a set of contactors 67 that is employed to switch power being supplied to the drive motor 18 from between power taken from across the arc and power drawn from the regulated power supply 21 or 21'. Contactors 67 may be utilized to isolate the power connections as determined by the connection of the power cable 25 so described above. By isolating power connections it is meant that only one of the power sources is electrically connected to deliver power to the motor 18. The alternate power source is therefore disconnected, or switched out of electrical connection with the drive motor 18. Even if power is available from the alternate power source, the contactors 67 may be configured to prevent that power source from delivering power to the motor 18. In one example, power from across the arc may be connected to rectifying circuit 40. The rectified signal is then directed to contactors 67, shown in FIG. 6, through connector J9 where electrical current flows through the set of normally closed contactors 67 and subsequently to the motor via one or more additional connectors. This may comprise the default source of power for the drive motor 18. When power cable 25, having an ample supply of power, is connected to the wire feeder 10, the normally closed contactors open responsive to the activation of a switch 75, as will be subsequently described. Power available from across the arc is thereby automatically disconnected from delivering power to the drive motor 18. In this mode of operation, power from power cable 25 flows through connector 43 to a second rectifying circuit 41 and subsequently through connector 42 for powering the drive motor 18 in a manner consistent with that described above. It is noted in the current embodiment that the circuitry conveying current from power cable 25 remains electrically connected at all times. Isolation of power from power cable 25 is facilitated by the physical disconnection of the power cable 25 to the wire feeder 10, and not by the opening/closing of contactors (or activation/deactivation of other switching means). However, it is to be construed additional sets of contactors may be employed to isolate connection of the power cable 25 as well. It is to be understood that the particular circuit components described herein and the manner of isolating power connections so described are exemplary in nature and not to be construed as limiting. Other devices, including but not limited to solid state devices, and other methods for selectively connecting power from disparate power sources may be utilized without limiting the scope of coverage of the embodiments of the subject invention.

Figure 5:
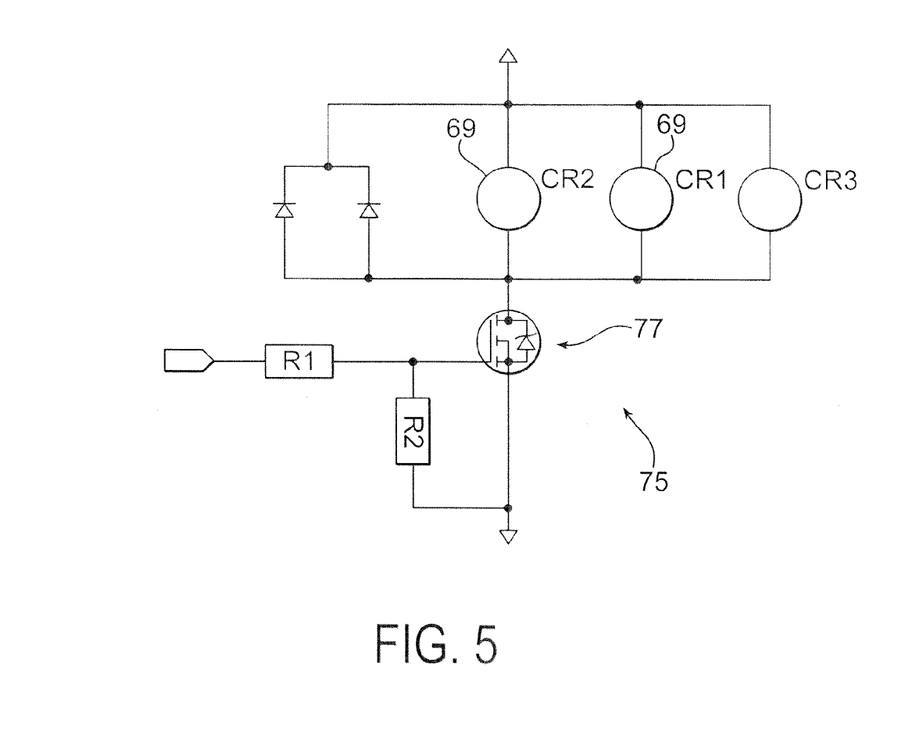
FIG. 5 is a schematic representation of a switching circuit according to the embodiments of the present invention.

With reference once again to FIGS. 3 and 6 and now also to FIG. 5, the contactors 67, or other switching means, may be selectively activated by an electrical switch, illustrated generally at 75. In one embodiment, the electrical switch 75, also termed switch 75, may include a solid state device like for example a transistor 77, which may be connected in series with one or more coils 69, although it will be appreciated that any type of electrical switch 75 or switching circuit may be utilized; solid state or otherwise. The coils 69 may be electromagnetically coupled to the contactors 67 and thus activated or deactivated in synchronous with the coils 69. The coils 69 and contactors 67 may therefore comprise a control relay. Multiple relays may be utilized, of which three (3) are included in the current embodiment: CR1, CR2 and CR3, for isolating power connections to the drive motor 18. It will be readily seen that power drawn from the transistor 77 flows through the circuit thereby energizing the coils 69 and activating the contactors 67. The trigger to the switch 75, or the transistor 77 as in the current embodiment, may be input from the logic processor 55. When signaled by the sensing circuit 60 that the power cable 25 is present and active with available power, the logic processor 55 may output a signal that triggers the switch 75, and consequently the contactors 67, to break the electrical path connecting power from across the arc to the drive motor 18. As mentioned above, the electrical pathways conveying power between the power cable 25 and the drive motor 18 may be continuously connected. Accordingly, power from the power cable 25 is immediately conveyed to the drive motor 18 upon connection of the power cable 25. Conversely, isolation of the power source 21, 21' is accomplished by physically removing the connector 27 of the power cable 25 from the wire feeder 10.

An alternate embodiment is contemplated wherein the ability to switch between power sources is manually controlled by an end user or operator. In this embodiment, the selection of power sources may be initiated by a manually operated device, such as selector switch 73. In other words, a selector switch 73 may be included and configured to allow power to be drawn from a single source, which may be from across the arc or from a regulated power source. The selector switch 73 may take one of several different forms like a mechanical switch having contactors, an electrical switch using solid state circuitry or any type of switching device suitable for use with the embodiments of the subject invention. It will be appreciated that the selector switch 73 may be used in conjunction with the sensing circuit 60. However, it is to be construed that the selector switch 73 may also be used in replacement of the sensing circuit 60 as a means for manually selecting the source from which the drive motor 18 draws power. In one exemplary manner, output from the selector switch 73 may be communicated to the logic processor 55. In other embodiments, the selector switch 73 may directly control the contactors 67 and/or power directed to transistor 77. Still any type of selector switch 73 or any connection of the selector switch 73 may be chosen with sound engineering judgment. In this manner, when it is desired to utilize power from the across the arc, the selector switch 73 may be set to one operating position wherein power is drawn from the open and closed circuit voltage of the power supply. Alternatively, the operating position of the selector switch 73 may be set to a second operating position to allow power to be drawn only from a separate regulated power source.

With reference to all of the Figures, operation of the wire feeder 10 will now be discussed. The wire feeder 10 may be connected to the welding power source 13 via the welding cables 23. Power for operating the wire feeder 10 may be taken directly from studs 19, 20, first from the open circuit voltage and subsequently from the studs after the welding arc has been struck. In this manner, the wire feeder 10 operates in a first mode, or default mode of operation. When the operator connects the power cable 25 from the regulated power supply 21, 21' to the wire feeder 10, the wire feeder controller 12 via the sensing circuit 60 detects the presence of the second power source and automatically connects or switches to that source of power for operating the drive motor 18. The wire feeder 10 thereby operates in a second mode of operation. The reverse situation also applies. When the operator disconnects the power cable 25, the wire feeder controller 12 switches the source of supply power to re-establish the supply of power from across the arc.

The invention has been described herein with reference to the preferred embodiment. Obviously, modifications and alterations will occur to others upon a reading and understanding of this specification. It is intended to include all such modifications and alternations insofar as they come within the scope of the appended claims or the equivalence thereof.

What is claimed is:

1. A system for welding, comprising:
a welding power supply having different power sources operable to deliver electrical power for establishing a welding arc;
a wire feeder including a wire feeder motor for continuously feeding an electrode;
the wire feeder having a power input cable comprising a first input for connecting the welding power supply to a first power source and a second input for connecting a second substantially different power supply to a second power source, wherein the first welding power source and the second substantially different power source are both physically connected to the wire feeder during a welding operation;
a sensing circuit between the wire feeder and the power supply configured to detect a presence or an absence of the second substantially different power source connected to the second input, and wherein said sensing circuit further comprises a logic processor having an input and at least a first output for automatically controlling power for driving the wire feeder motor from between the welding arc and a separate regulated power supply;
at least a first switch for selectively establishing an electrical connection between the separate regulated power supply and the wire feeder motor; and, wherein the at least a first switch is activated responsive to the at least a first output of the logic processor; and,
a controller operable to switch power for operating the wire feeder motor from the first welding power source to the second substantially different power source in response to the sensing circuit detecting the presence of the second substantially different power source, wherein the first welding power source and the second substantially different power source are each independently operable to power the wire feed motor for continuously feeding the electrode.

2. The system as defined in claim 1, wherein power from the welding power source for operating the wire feeder motor is taken from across the welding arc, and
wherein the second substantially different power supply is a separate regulated power supply; and further comprising:
a power cable for communicating electrical power from the separate regulated power supply to the controller.

3. The system as defined in claim 1, wherein said sensing circuit further comprises an output for detecting connection of the power cable; and,
wherein the output is operatively connected to the input of the logic processor.

4. The system as defined in claim 2, wherein the separate regulated power supply is integrated into the welding power source.

5. The system as defined in claim 2, wherein when power is detected on the power cable, the controller automatically switches from power fed to the wire feeder motor from the welding arc to power fed to the wire feeder motor from the separate regulated power supply.

6. The system as defined in claim 5, wherein when the power cable is disconnected from the controller, the controller automatically switches from power fed to the wire feeder motor from the separate regulated power supply to power fed to the wire feeder motor from the welding arc.

7. A system for welding, comprising:
a welding power supply having different power sources operable to deliver electrical power for establishing a welding arc;
a wire feeder including a wire feeder motor for continuously feeding an electrode;
the wire feeder having a power input comprising a first input for connecting the welding power supply to a first power source and a second input for connecting a second substantially different power supply to a second power source, wherein the first welding power source and the second substantially different power source are both physically connected to the wire feeder through the same power cable during a welding operation;
a controller operable to receive power for operating the wire feeder motor from the first welding power source and the second substantially different power source; and,
a manual switching device operatively connected to the controller for selecting power from one of the first welding power source and the second substantially different power source to operate the wire feeder motor,
wherein the controller is operable to switch power for operating the wire feeder motor from the first welding power source to the second substantially different power source in response to operation of the manual switching device;
wherein the first welding power source and the second substantially different power source are each independently operable to power the wire feed motor for continuously feeding an electrode.

8. A method of switching a source of electrical power from two different power sources to a wire feeder motor of a welding wire feeder system, comprising the steps of:
providing a welding wire feeder system having a power input cable comprising a first input operable to draw power from an associated welding arc for operating a wire feeder motor and and a second input operable to receive power for operating the wire feeder motor from a separate regulated power supply, wherein the power from an associated welding arc and the separate regulated power supply are each independently operable to power the wire feeder motor during a welding operation;
connecting power from the separate regulated power supply from a first power source to the welding wire feeder system such that both the power from the associated welding arc from the first power source and power from the second separate regulated power supply are physically connected to the welding wire feeder system during a welding operation; and,
automatically drawing power from the separate regulated power supply to operate the wire feeder motor in replacement of drawing power from an associated welding arc in response to detecting a presence of power from the separate regulated power supply connected to the welding wire feeder system; and
disconnecting power of the separate regulated power supply from the welding wire feeder system thereby automatically switching power drawn to operate the wire feeder motor from the separate regulated power supply to power drawn from the associated welding arc to operate the wire feeder motor.

9. A system for welding, comprising:
a welding power supply having different power sources operable to deliver electrical power for establishing a welding arc;
a wire feeder having a wire feeder motor for feeding an associated electrode used with the welding arc, the wire feeder having a power input cable comprising a first input for connecting the power supply to a first power source and a second input for connecting a second substantially different power supply to a second power source;
a sensing circuit configured to detect a presence or an absence of power from a separate regulated power source connected to the wire feeder contemporaneously with power from the welding power source, and further configured to determine whether the power from the separate regulated power source exceeds a threshold voltage needed to operate the wire feeder motor, and further and wherein said sensing circuit further comprises a logic processor having an input and at least a first output for automatically controlling power for driving the wire feeder motor from between the welding arc and the separate regulated power source;
at least a first switch for selectively establishing an electrical connection between the separate regulated power source and the wire feeder motor; and, wherein the at least a first switch is activated responsive to the at least a first output of the logic processor;
a controller operable to switch power for operating the wire feeder from between power drawn from across the welding arc and from power drawn from the separate regulated power source in response to the sensing circuit determining whether the power from the separate regulate power source exceeds a threshold voltage needed to operate the wire feeder motor; and,
a power cable for communicating electrical power from the separate regulated power source to the controller,
wherein the power from the welding arc and the separate regulated power source are each independently operable to power the wire feeder motor during a welding operation.

* * * * *

UNITED STATES PATENT AND TRADEMARK OFFICE
CERTIFICATE OF CORRECTION

| | | |
|---|---|---|
| PATENT NO. | : 8,803,031 B2 | Page 1 of 1 |
| APPLICATION NO. | : 12/476511 | |
| DATED | : August 12, 2014 | |
| INVENTOR(S) | : Meckler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this
Eighth Day of September, 2015

Michelle K. Lee
*Director of the United States Patent and Trademark Office*